United States Patent [19]

Mizuno et al.

[11] Patent Number: 5,439,293
[45] Date of Patent: Aug. 8, 1995

[54] RAIL CONSTRUCTION FOR MACHINE TOOL

[75] Inventors: Sadao Mizuno, Nagoya; Akinori Hoshino, Toyota, both of Japan

[73] Assignee: Aisin Seiki Kabushiki Kaisha, Kariya, Japan

[21] Appl. No.: 306,944

[22] Filed: Sep. 16, 1994

[30] Foreign Application Priority Data

Sep. 17, 1993 [JP] Japan .................. 5-231996

[51] Int. Cl.⁶ .............................................. F16C 29/06
[52] U.S. Cl. .......................................... 384/9; 384/41; 384/42
[58] Field of Search ................... 384/9, 41, 42, 43, 44, 384/45

[56] References Cited

U.S. PATENT DOCUMENTS 3,618,432  11/1971  Briese .

FOREIGN PATENT DOCUMENTS

| 0253930 | 1/1988 | European Pat. Off. . |
| 0324125 | 7/1989 | European Pat. Off. . |
| 3818361 | 12/1989 | Germany . |
| 59-124533 | 7/1984 | Japan . |
| 2052514 | 1/1981 | United Kingdom . |

OTHER PUBLICATIONS

Werkstatt Und Betrieb, Prössler, "Mineralguss–alternativer Konstruktionswerkstoff für den Maschinenbau", vol. 123, No. 9, Sep. 1990, pp. 707–710.

*Primary Examiner*—Lenard A. Footland
*Attorney, Agent, or Firm*—Burns, Doane, Swecker & Mathis

[57] ABSTRACT

A rail construction for a machine tool includes a bed made of resin concrete, a pair of laterally spaced rails made of resin concrete which extend along a lengthwise direction of the bed and which and have an upper portion on which a table is slidably mounted, and a reinforcing member inserted into each of the rails such that the reinforcing member is out of concern with the movement of the slide table along the upper surface of each of the rails.

11 Claims, 4 Drawing Sheets

RAIL CONSTRUCTION FOR MACHINE TOOL

FIELD OF THE INVENTION

The present invention relates to a machine tool and more particularly, a rail construction for a machine tool.

1. Background of the Invention

As shown in FIG. 8, a conventional machine tool includes a bed 71 made of resin concrete, a pair of laterally spaced steel rails 76 extending along a lengthwise direction of the bed 71, and a slide table 77 on which a head portion (not shown) is mounted. Whenever the table 77 moves along the rails 76, heat is generated as a result of friction between the table 77 and the rails 76. Due to the fact that the thermal conductivity of the resin concrete is less than the thermal conductivity of the rail 76, the resulting sliding heat will cause a curvature or bending of the rail 76 relative to the bed 71. Such a curvature is undesirable as it inhibits or prevents smooth movement of the table 77.

2. Summary of the Invention

It is therefore an object of the present invention to provide a rail construction for a machine tool that does not possess the foregoing drawbacks.

Another object of the present invention is to provide a rail construction for a machine tool in which each rail is free from thermal curvature.

To achieve at least the foregoing objects, a rail construction for a machine tool is comprised of a bed made of resin concrete, a pair of laterally spaced rails made of resin concrete which extend along a lengthwise direction of the bed and which have an upper portion on which a slidable table is mounted for a movement thereof, and a reinforcing member inserted into each of the rails such that the reinforcing member is located at a position in which the weight of the slide table does not act on or is not applied to the reinforcing member during the sliding movement of the slide table to thereby avoid generating heat which would otherwise result in thermal deformation of the reinforcing members.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which like elements bear like reference numerals and wherein.

DETAILED DESCRIPTION OF PREFERRED EMBODIMENTS

Figure 1:
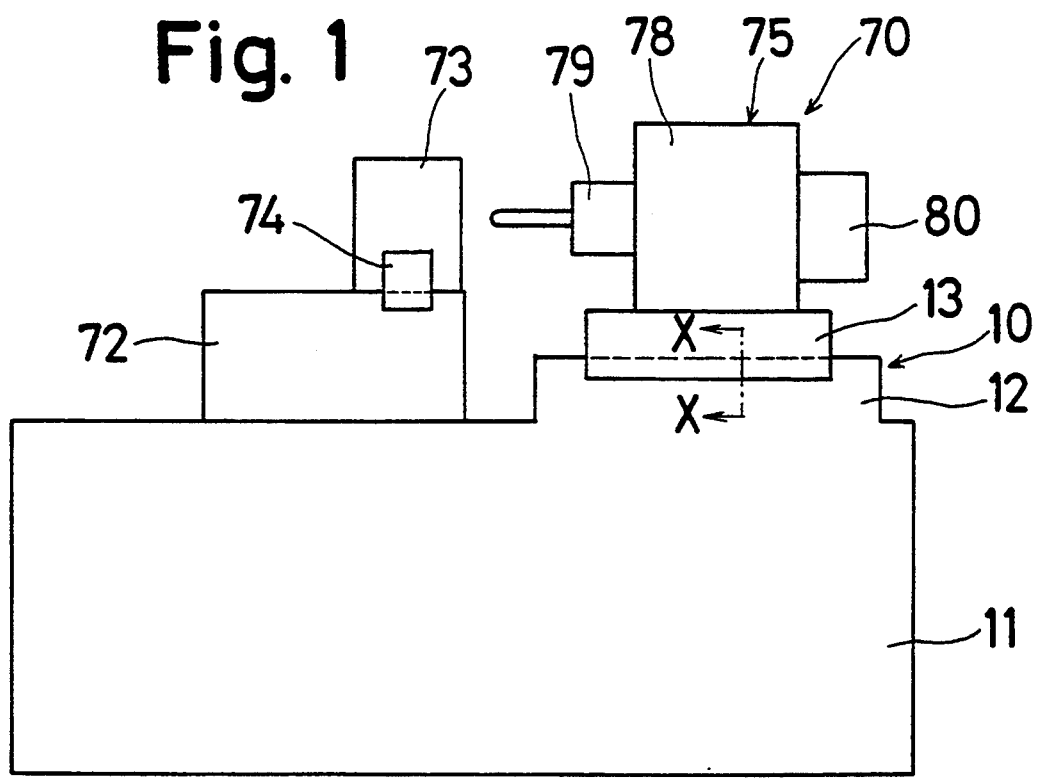
FIG. 1 is a schematic illustration of a machine tool to which the present invention is applied.
Figure 2:
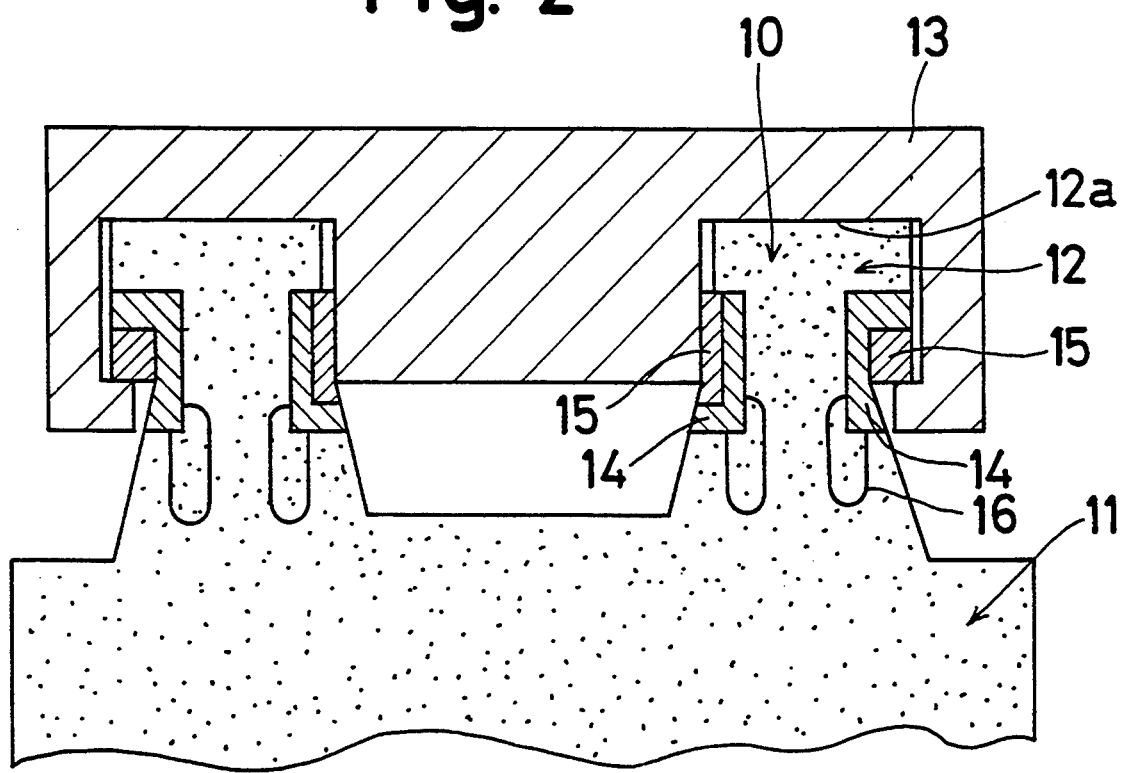
FIG. 2 is a cross-sectional view of a portion of the machine tool shown in FIG. 1 taken along the section line 2—2 in FIG. 1 and illustrating a first embodiment of the present invention.

Referring initially to FIGS. 1 and 2, the machine tool 70 according to the present invention includes a bed 11 on which a base member 72 is mounted. A workpiece 73 is mounted on the base member 72 and is secured to the base member 72 by way of a clamp member 74. A head stock 75 is mounted on the table 11 to oppose to the workpiece 73. The head stock 75 has a rectangular sliding rail means 10, the details of which will be described in more detail below, a slide table 13, a column 78 secured to the slide table 13, a head portion 79 for machining the workpiece 73, and a motor 80 for driving the head portion 79.

The rectangular sliding rail means 10 is comprised of a pair of laterally spaced rails 12 which each extend in the lengthwise direction of the bed 11. The rails 12 are formed integrally and in one piece with the bed 11. The bed 11 and the rail 12 are made of the same material, specifically so-called resin concrete. In order to obtain the resin concrete, conglomerate pebbles or broken stones are mixed into a resin and formed into a mass. In this embodiment, gabbro is used as the pebble or stone and epoxy resin is used as the resin. The thermal conductivity of the resin concrete is less than that of metal.

An upper surface 12a of the rails 12 slidably supports the sliding table 13. The friction or sliding heat generated when the sliding table 13 slides along the rails 12 is inhibited from accumulating in the bed 11 due to its lower thermal conductivity. Thus, the thermal deformation of the bed 11 can be prevented. It is to be noted that the friction heat is absorbed in the sliding table 13 which is cooled by cutting oil while the machine tool 70 is in operation. Thus, as a whole no member is affected by the foregoing friction heat generation.

In order to establish a smooth guidance for the sliding table 13 along the rails 12, a set of steel members 14 and 15 is provided. The steel members 14, 15 are connected to each other via a bolt and are secured or fixed to each lengthwise side of the rail 12 by being disposed as an insert in a recessed portion of the sides of the rails 12. To rigidly connect the steel 14 to the bed 11, an iron reinforcing rod 16 is provided which is welded to the steel 14. The steels 14 and 15 are also used to reinforce the rail 12 against a force applied thereto along a horizontal direction as seen in FIG. 2. One of the iron-family metals is preferably employed to manufacture the steels 14, 15.

The resin concrete is relatively large in vibration damping ratio. Thus, when machining the workpiece 73, the time duration required for absorbing vibration generated at the workpiece 73 is reduced.

To obtain the above-described structure, the following procedure or operation is employed. Opposite end portions of the iron reinforcing rod 16 which is formed as an oval shape are welded to the reinforcing metal 14. Next, the reinforcing metal 14 and the attached iron reinforcing rod 16 are allocated or positioned within a cavity or mold (not shown) having a cross-section which is identical to that defined by the bed 11 and the rails 12. An amount of resin concrete in the form of a liquid is poured or supplied into the cavity or mold and is formed into a solid mass. The resultant mass is removed from the cavity or mold and the reinforcing metal 15 is secured to the reinforcing metal 14 via the bolt. Thus, the bed 11 including the rails 12 is produced.

Figure 3:
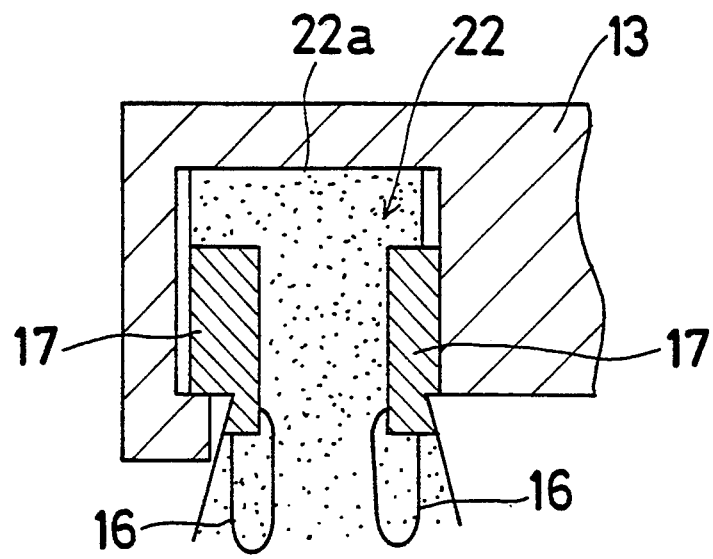
FIG. 3 is a cross-sectional view similar to FIG. 2 illustrating a principal portion of a second embodiment in accordance with present invention.

As shown in FIG. 3, instead of the foregoing reinforcing steels or metals 14, 15, a sole reinforcing steel 17, which is in the form of an integration of the two reinforcing steels, can be used.

Figure 4:
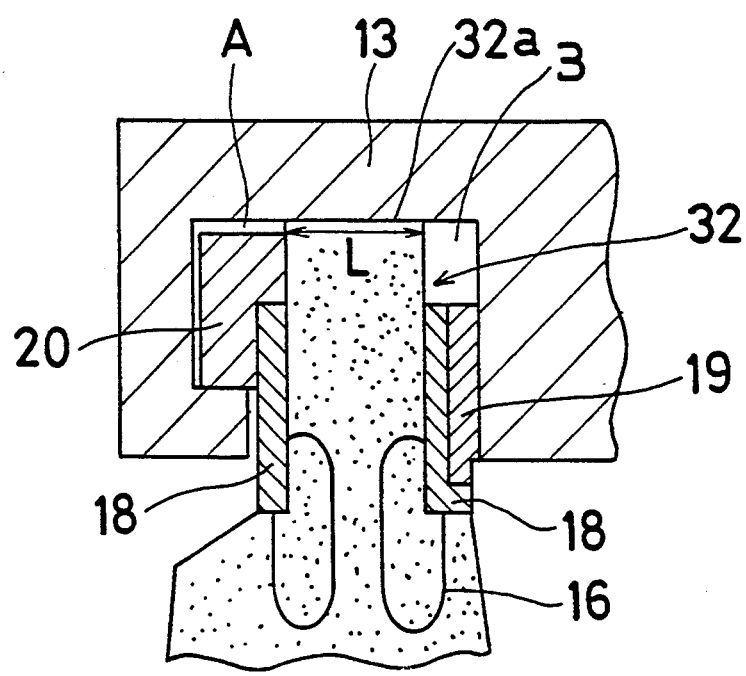
FIG. 4 is a cross-sectional view similar to FIG. 2 illustrating a principal portion of a third embodiment in accordance with present invention.

In FIG. 4, the width L of the rail 12 is set to be less than that shown in the embodiment of FIG. 3. In addition, spaces A, B are defined between the slide table 13 and reinforcing steels 19, 20 secured to a reinforcing steel 18.

Figure 5:
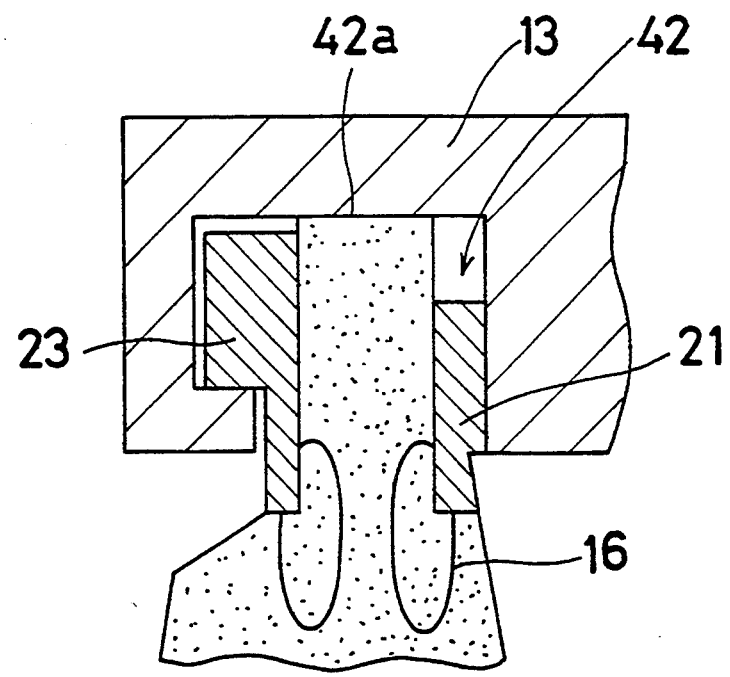
FIG. 5 is a cross-sectional view similar to FIG. 2 illustrating a principal portion of a fourth embodiment in accordance with present invention.

Instead of the foregoing reinforcing steels or metals 20, 18 and 19, 18 shown in FIG. 4, the alternative shown in FIG. 5 can be employed. Here, single reinforcing steels 21, 23 which are each in the form of an integration of the two sets of steels 20, 18 and 19, 18 can be used.

Figure 6:
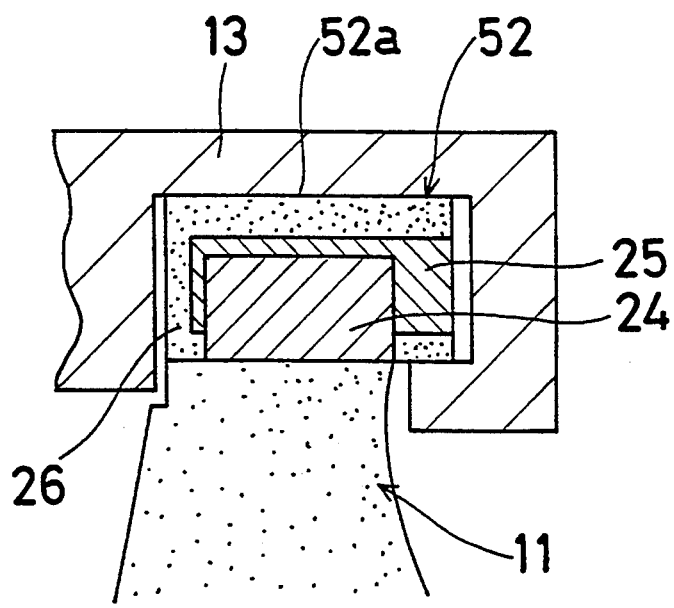
FIG. 6 is a cross-sectional view similar to FIG. 2 illustrating a principal portion of a fifth embodiment in accordance with present invention.
Figure 7:
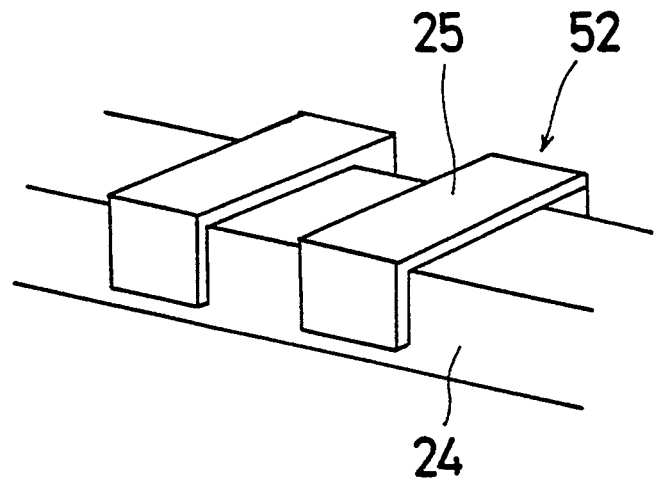
FIG. 7 is a perspective view of the principal portion shown in FIG. 6.
Figure 8:
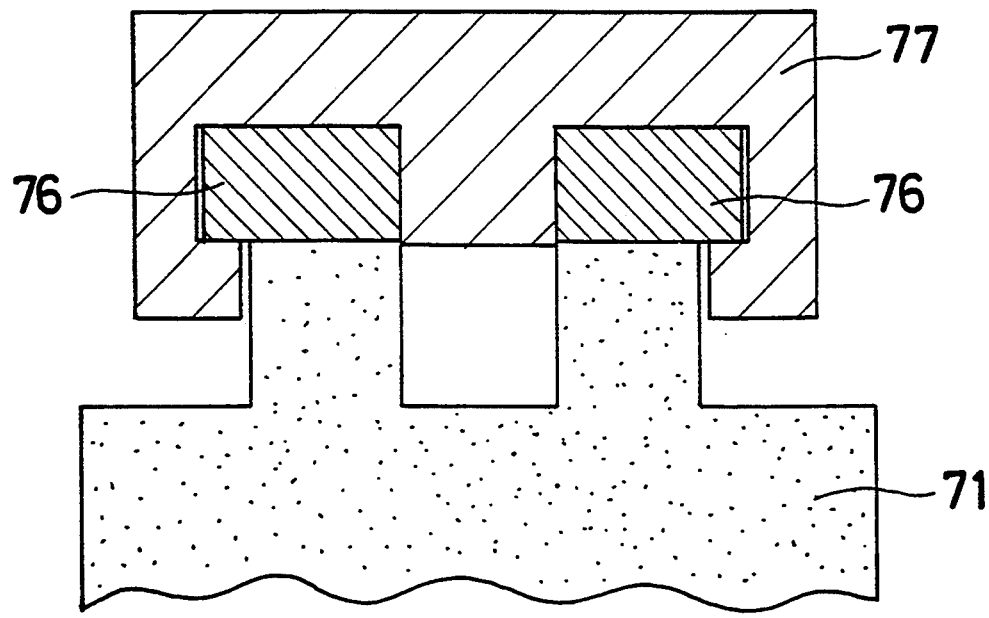
FIG. 8 is a cross-sectional view of a conventional rail structure of a machine tool.

According to another embodiment of the present invention shown in FIGS. 6 and 7, a first reinforcing member 24 extends along a sliding direction of a slide table 13. A plurality of spaced second reinforcing member 25 are mounted on the first reinforcing member 24. The first reinforcing member 24 and second reinforcing members 25 are embedded in a rail 26 in such a manner that a right side of each of the second reinforcing members 25 is exposed to the outside. The rail 12 is appropriately fixed to the bed 11 by, for example, a bolt.

The embodiments of the invention described above are advantageous in that the reinforcing members are located at a position which ensures that the weight of the slide table 13 is not applied to and does not act on the reinforcing members during sliding movement of the slide table. That is, the reinforcing members are spaced from the surface of the slide table which bears on the upper surface of the rails during movement of the slide table along the upper surface of the rails. As a result, thermal deformation of the reinforcing members can be avoided since significant heat due to the sliding movement of the slide table 13 is not generated.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A rail construction for a machine tool comprising:
 a bed made of resin concrete;
 a pair of laterally spaced rails made of resin concrete, each rail extending along a lengthwise direction of the bed and having an upper surface;
 a slidable table mounted for slidable movement on the upper surface of the rails; and
 a reinforcing member mounted on each of the rails and disposed so that the reinforcing members are spaced from a surface of the slide table which bears on the upper surface of the rails during movement of the slide table along the upper surface of the rails.

2. A rail construction as set forth in claim 1, wherein the bed and the rails are formed integrally and in one piece with each other.

3. A rail construction as set forth in claim 1, wherein the resin concrete of which the bed and rails are made includes conglomerate pebbles mixed into a resin.

4. A rail construction as set forth in claim 3, wherein the resin in an epoxy resin and the pebbles are gabbro.

5. A rail construction as set forth in claim 1, wherein the bed and the rails are separate from one another and are connected to each other.

6. A rail construction a set forth in claim 1, wherein each reinforcing member comprises two parts that are secured to each other.

7. A rail construction as set forth in claim 1, including a space disposed between each reinforcing member and the slide table, each space being enclosed by the slide table, the rail and the reinforcing member.

8. A rail construction as set forth in claim 1, wherein each reinforcing member is embedded in one of the rails so that the rail overlies the reinforcing member.

9. A rail construction for a machine tool comprising:
 a bed made of resin concrete;
 a pair of laterally spaced rails made of resin concrete, each rail extending along a lengthwise direction of the bed and having an upper surface;
 a slidable table mounted for slidable movement on the upper surface of the rails;
 a reinforcing member mounted on each of the rails; and
 means for avoiding application of the weight of the slide table to the reinforcing members during sliding movement of the slide table along the upper surface of the rails.

10. A rail construction as set forth in claim 9, wherein said means for avoiding application of the weight of the slide table to the reinforcing members includes the reinforcing members being embedded in one of the rails so that the rail overlies the reinforcing member.

11. A rail construction as set forth in claim 9, wherein said means for avoiding application of the weight of the slide table to the reinforcing members includes a space disposed between each reinforcing member and a surface of the slide table which bears on the upper surface of the rails during movement of the slide table along the upper surface of the rails.

* * * * *